United States Patent [19]

Bloom

[11] Patent Number: 4,996,287
[45] Date of Patent: Feb. 26, 1991

[54] THERMOFORMABLE POLYARYLETHERKETONE SHEET

[75] Inventor: Joy S. Bloom, Wilmington, Del.

[73] Assignee: E. I. Du Pont de Nemours and Company, Wilmington, Del.

[21] Appl. No.: 283,695

[22] Filed: Dec. 13, 1988

[51] Int. Cl.$^5$ ............................................. C08G 8/02
[52] U.S. Cl. .................................... 528/125; 528/126; 528/128
[58] Field of Search ......................... 528/125, 126, 128

[56] References Cited

U.S. PATENT DOCUMENTS 4,616,056 10/1986 Chan et al. ........................ 528/125
4,624,886 11/1986 Cogswell et al. .................. 428/245
4,657,717 4/1987 Cattansch et al. ................ 264/10.2
4,662,887 5/1987 Turner et al. ......................... 623/16

Primary Examiner—John Kight, III
Assistant Examiner—P. Hampton Hightower
Attorney, Agent, or Firm—Paul R. Steyermark

[57] ABSTRACT

A thermoformable polyaryletherketone sheet of a thickness of about 625–5000 micrometers, having repeating units derived from diphenyl ether and terephthalyl and isophthalyl groups, especially a polyetherketoneketone in which the terephthalyl to isophthalyl isomer ratio is about 70:30 to 0:100, especially 60:40 to 50:50, which thermoformable sheet has a crystallinity of 5% of less, can be fabricated into three-dimensional articles such as, e.g., panels and ducts for aircraft interiors having good formability and mold replication.

20 Claims, 3 Drawing Sheets

FIG.3
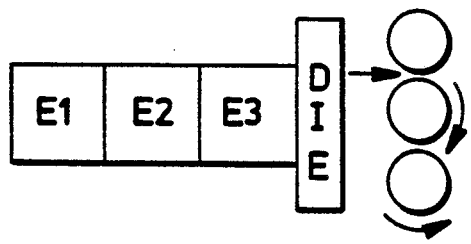
FIG.4  FIG.4A  FIG.4B
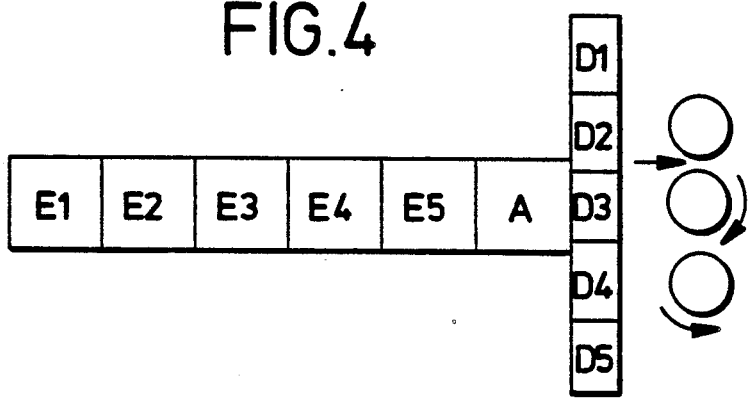 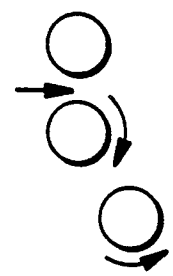
FIG.5
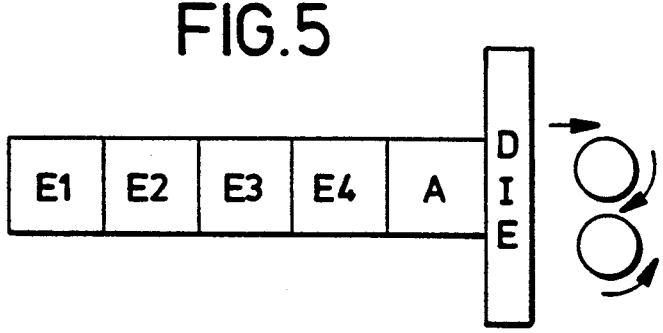

THERMOFORMABLE POLYARYLETHERKETONE SHEET

BACKGROUND OF THE INVENTION

This invention relates to a novel thermoformable polyaryletherketone sheet and to thermoformed articles produced therefrom.

Shaped articles can be prepared from thermoplastic sheets using a thermoforming process. Thermoforming is defined in Tool and Manufacturing Engineers Handbook (Vol. 2, 4th Edition, Society of Manufacturing Engineers, Dearborn, Michigan, 1984, Charles Wick, Editor) as a process in which a thermoplastic sheet is heated to its processing temperature and, using mechanical methods or differential pressure created by vacuum and/or pressure, is forced to contact a mold surface and cooled while held to the contours of the mold until it retains the shape of the mold.

It is well known by those skilled in the art of thermoforming that processing temperatures at or above the crystalline melting points are required to form articles from semicrystalline polymers. Thus, as described in the art, the temperatures required for thermoforming polyaryletherketone sheets are in the range of 300° to 400° C., where these materials melt.

Polyaryletherketones consisting of condensation products of diphenyl ether and isophthalyl and terephthalyl chlorides, are disclosed in U.S. Pat. Nos. 3,516,966 (Berr), 3,666,612 (Angelo), and 3,637,592 (Berr). Films up to 300 micrometers in thickness have been prepared.

Thermoformable composites consisting of long fiber-reinforced polyaryletherketone matrices, are described in U.S. Pat. Nos. 3,434,914 (Sterman et al.), 4,624,886 (Cogswell et al.), 4,613,393 (Cattanach et al.) and 4,657,717 (Cattanach et al. The processing temperatures required to thermoform those composites were in each case at the crystalline melting point of the polymer matrix or higher.

It is known, for example, that an amorphous polyethylene terephthalate sheet can be readily thermoformed, and the thermoformed article can then be annealed to induce crystallization, which improves its mechanical properties, specifically tensile modulus, U.S. Pat. No. 4,457,797 (Hatchadoorian et al.). However, polyethylene terephthalate differs from polyaryletherketones in that the former can be extruded into sheets above its melting point and cooled to room temperature without inducing crystallization, while the latter tend to crystallize very fast on cooling and therefore cannot be readily extruded into amorphous sheets.

It would be highly desirable to be able to provide amorphous polyaryletherketone sheets, thermoformable at lower temperatures, comparable with those used for sheets made of other thermoformable materials, such as, e.g., polycarbonates or acrylics, say, in the vicinity of 160° C. Such a development would represent a significant improvement over the art because of lower energy requirements and lower capital investment.

SUMMARY OF THE INVENTION

According to this invention there is provided a polyaryletherketone sheet having a thickness of about 625 to 5000 micrometers, wherein the polyaryletherketone has a crystallinity of about 5% or less and consists essentially of repeating units selected from the group represented by the following formulas I, II, and III:

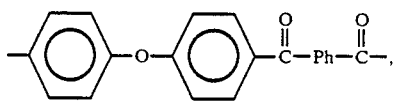

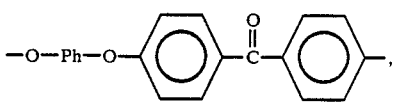

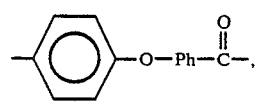

wherein Ph is either the 1,4-phenylene or the 1,3-phenylene group. In the former case, the

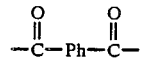

moiety in formula I is the terephthalyl group (T), and in the latter case, it is the isophthalyl (I) group. In the case of polyaryletherketones represented by formula I, the T:I isomer ratio is about 70:30 to 0:100, preferably 60:40 to 0:100, and especially 60:40 to 50:50. Near the lower end of its thickness range, the sheet is thermoformable at temperatures as low as about 160° C.

The polyaryletherketones represented by formula I also are known in the industry as polyetherketoneketones or PEKK's, these represented by formula II as polyetheretherketones or PEEK's, and those represented by formula III as polyetherketones or PEK's.

BRIEF DESCRIPTION OF THE DRAWINGS

FIG. 3 is a schematic drawing of an extruder and a chill roll stack.

FIG. 4 is a schematic drawing of another extruder and two alternative embodiments of chill roll stacks, a and b FIG. 5 is a schematic drawing of yet another extruder and a chill roll stack.

DETAILED DESCRIPTION OF THE INVENTION

Figure 1:
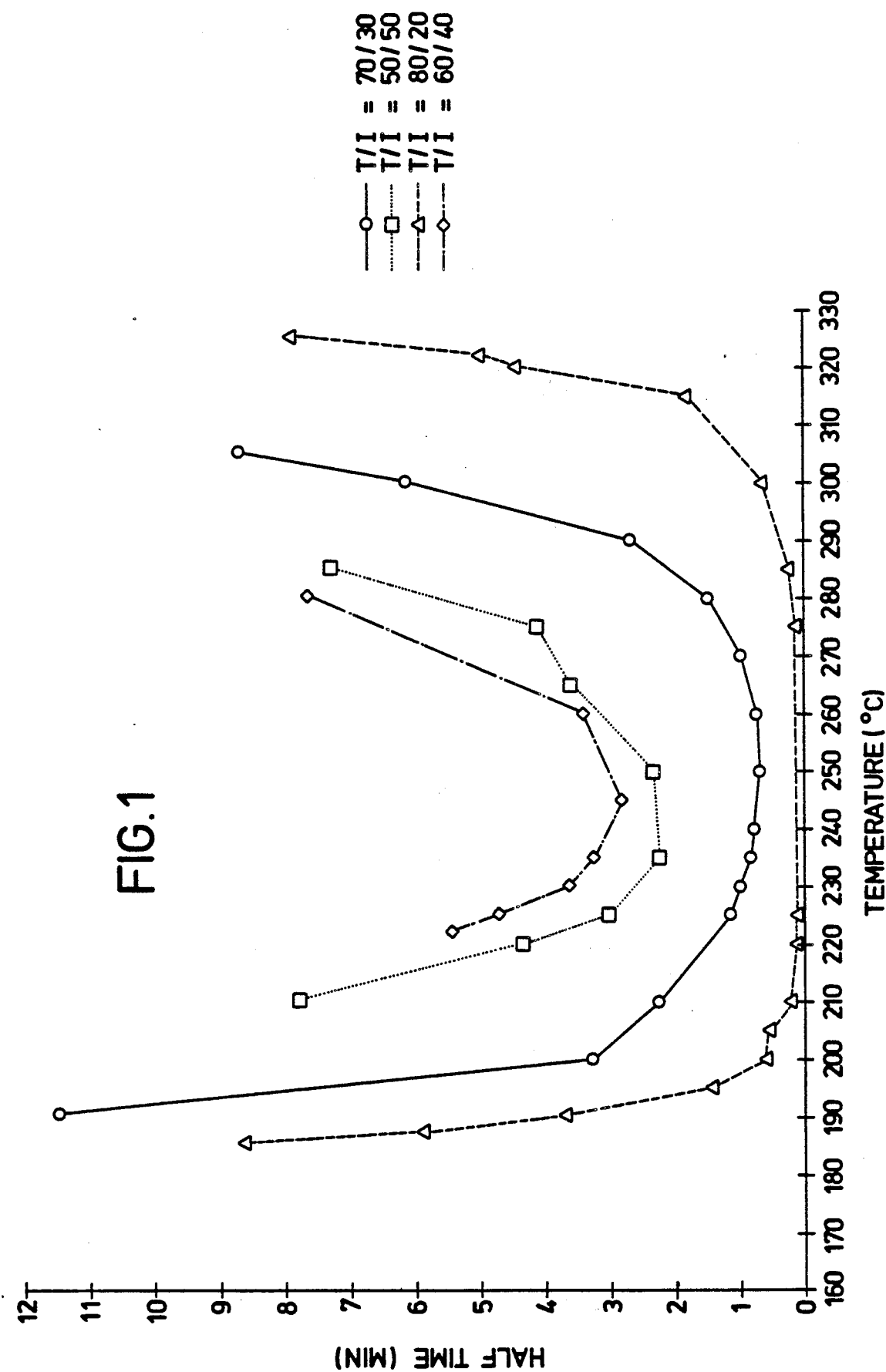
FIG. 1 is a plot of crystallization half-time, in minutes, of various polyetherketoneketones vs. temperature, in degrees Celsius.

The polyetherketoneketones suitable for making sheets of this invention can be obtained, e.g.. by a reaction of terephthalyl chloride and isophthalyl chloride with diphenyl ether in the presence of a Friedel-Crafts catalyst, as described in U.S. Pat. Nos. 3,065,205 (Bonner), 3,441,538 (Marks), 3,442,857 (Thornton) and U.S. patent application Ser. No. 762,252 of Gay et al., now allowed. Suitable polyetheretherketones can be made, e.g., as described in U.S. Pat. No. 4,176,222 (Cinderey et al.). Suitable polyetherketones are described. e.g., in U.S. Pat. No. 3,953,400 (Dahl).

The polyaryletherketone compositions from which the thermoformable sheets of this invention are made can contain non-nucleating fillers in an amount of up to 50% by weight of the total composition. Representative fillers include titanium dioxide inorganic pigments, carbon black, glass spheres, calcium sulfate, and such chemically inert organic particulate materials as can withstand processing temperatures above 320° C. Up to 5% by weight of the total composition can be an inorganic, fibrous reinforcement, such as, e.g., wollastonite and chopped glass strands less than about 0.46 cm long.

The polyaryletherketone compositions suitable in the present invention are thermoplastic materials, which can be formed into sheets by standard processing methods such as, e.g., melt extrusion and injection molding. Thermoformable sheets will be preferably made by melt extrusion. Conventional single screw or twin screw extruders sheeting dies, and take-up devices designed for extrusion of thermoplastic resins into sheets are satisfactory. The extrusion temperature will depend on the polymer melt temperature (which is influenced by the 1,4/1,3-phenylene ratio of the polyaryletherketone) as well as on the molecular weight (or melt viscosity). For example, when the T:I isomer ratio in a PEKK is 70:30 or 50:50, the preferred extrusion temperature is between about 360° C. and 370° C.; and when the T:I isomer ratio is 60:40, the preferred extrusion temperature is between about 325° C. and 340° C. The melt viscosity of the PEKK's suitable in this invention preferably will range from about 3000 Pa-s to about 300 Pa-s at a shear rate of 180 s$^{-1}$, as measured at 360° C. for the T/I isomer ratio of 70:30 and 50:50 and at 340° C. for the T/I isomer ratio of 60:40 in a capillary rheometer equipped with a die with an orifice 1.19 mm in diameter and a length-to-diameter ratio of 3.91. In general, extrusion temperatures from about 10° C. to about 50° C. above the melting point of the polyaryletherketone are satisfactory. Extrusion temperatures near the lower end of the above range are preferred in order to minimize degradation, and preferably should be less than 400°C. Also, as sheet thickness is increased, it is usually preferable to operate at the lower end of the available temperature range. Higher extrusion temperatures are possible, but polymer degradation is more likely.

The extruded polyaryletherketone sheet is conveyed from the die directly over polished metal or textured roll(s), commonly termed "chill rolls" because the surface temperature of these rolls is maintained at a level below the melt temperature of the polymer. The rate at which the sheet is cooled, termed the quench rate, and solidified is a critical aspect in achieving the amorphous sheet structure required in this invention. The quench rate is largely determined by the temperature of the chill rolls, sheet thickness and line speed and must be sufficiently rapid for the forming characteristics and physical properties inherent in the sheet of this invention to be realized, without being so rapid that a warped or curled sheet results. It is believed that the dependence of physical properties and thermoformability on quench rate is related to inherent polymer properties, such as crystallization rate and the rate of solidification of the polymer as it cools through the glass transition temperature.

Figure 2:
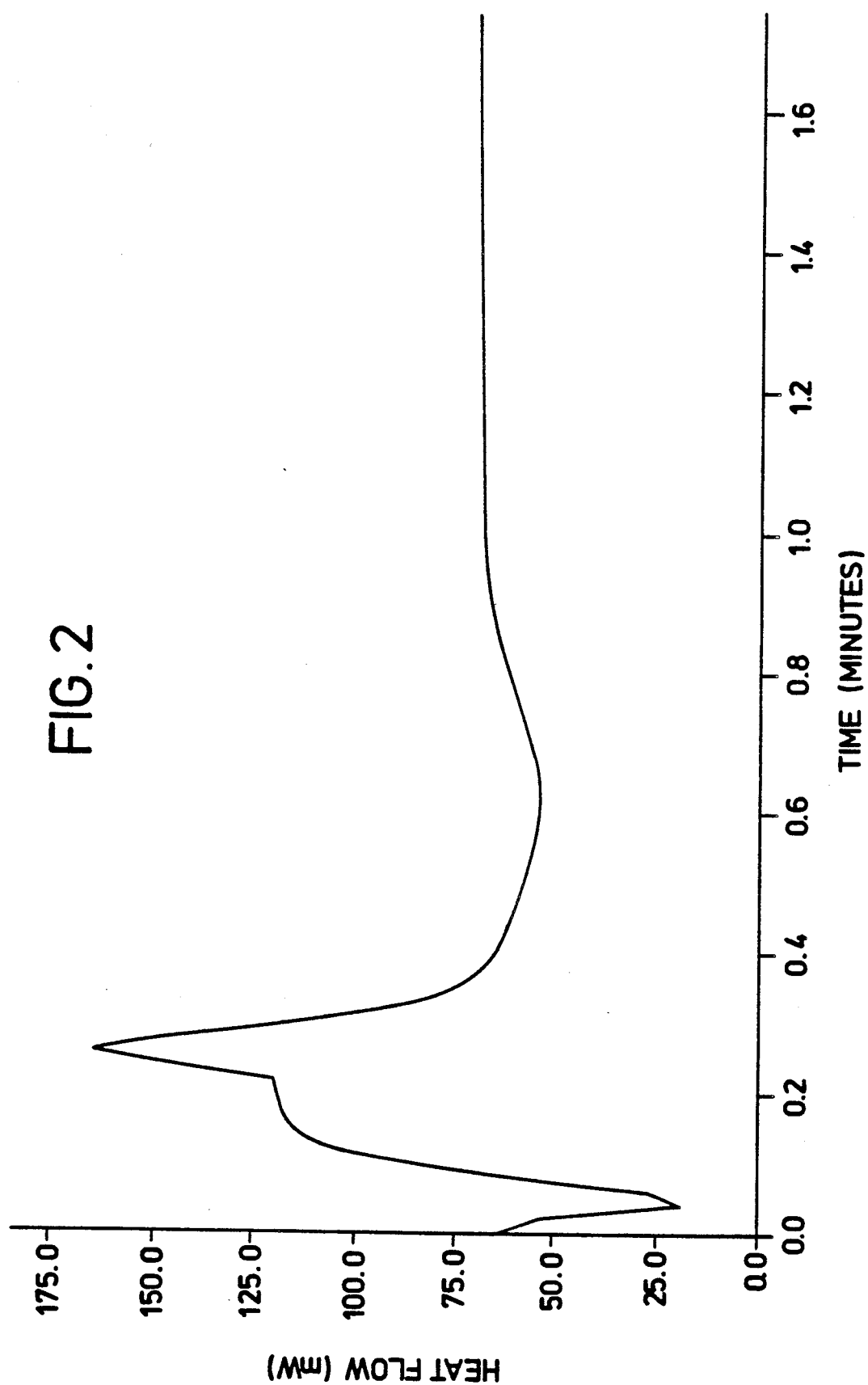
FIG. 2 is a differential scanning calorimetry (DSC) plot of a typical polyetherketoneketone.

Referring now to FIG. 1, it represents a plot of a polyaryletherketone properly arbitrarily called "crystallization half-time" versus temperature. According to the definition adopted by the inventor, crystallization half-time is the amount of time it takes an amorphous sample to reach the crystallization exotherm maximum of the polymer, as determined by differential scanning calorimetry (DSC), when held at a given temperature. Thus, while crystallization half-time does not necessarily represent half of the time required for the completion of the crystallization process, it has been demonstrated to be predictive of observed behavior for the systems under consideration. FIG. 2 is a typical DSC scan of this type for a PEKK having a T/I isomer ratio of 70:30.

The minimum quenching rates for various polyaryetherketones can be estimated as follows:

(a) It has been experimentally demonstrated by X-ray crystallography that maximum PEKK crystallinity, $Cr_{max}$, is 30% ±3%.

(b) It is assumed that approximately one-half of $Cr_{max}$ (or 15%) will be reached at the end of crystallization half-time, as defined above.

(c) At normal quenching rates, significant crystallization occurs only along the lowest portion of the curves shown in FIG. 1. See Table 1, below.

(d) A satisfactory quenching rate will be such that the temperature span from the melt processing temperature to the lowest temperature in the significant crystallization range will be traversed within at most one-third of the shortest crystallization half-time, $(t_\frac{1}{2})_{min}$ so that crystallinity will be at most about 5%.

In the general case, for different $Cr_{max}$, this temperature span will be traversed within at most a time span equal to $$(t_\frac{1}{2})_{min} \times 5\%/0.5 Cr_{max}\% = 10(t_\frac{1}{2})_{min}/Cr_{max}.$$

Table 1 shows estimated shortest crystallization half-times (from FIG. 1) and minimum quench rates for selected PEKK's.

TABLE 1

| Composition T/I isomer ratio | Shortest crystall. half-time, min. | Significant cryst. temp. range, °C. | Typical melt processing temp., °C. | Min. quench rate, °C./min | Max. line speed, m/min | Max. sheet thickn. microm. |
|---|---|---|---|---|---|---|
| 50/50 | 2 | 275-210 | 360 | 225 | 0.9-2.3 | 625-2000 |
| 60/40 | 2.75 | 270-215 | 340 | 135 | 0.9-3.6+ | 625-5000 |
| 70/30 | 1 | 285-205 | 360 | 465 | 0.9 | 625 |
| 80/20 | 0.25 | 320-190 | 380 | 2280 | impract. | 625 |

As an example, for a 70:30 terephthalyl to isophthalyl isomer ratio, an extruded 74 cm wide, 1000 micrometer (0.1 cm) thick PEKK sheet having a specific gravity of approximately 1.45 g/cm$^3$, moving at a line speed of 0.9 m/min (1.9 kg of material per min) is quenched from the melt processing temperature of 360° C. to 205° C. (a temperature drop of 155° C.). This temperature range should be traversed in one-third of the shortest crystallization half-time (which is 1 minute), or in approximately 20 seconds or less, so that the quench rate is approximately 465° C./min.

Quench rate determines whether crystallinity develops in the extruded sheet. Table 1 includes three important variables: T/I isomer ratio, sheet thickness, and line speed. As line speed increases and/or thickness increases, the longer the sheet is at a higher temperature (heat dissipation being less efficient), and hence the greater is the risk of developing crystallinity, unless the quench rate for the particular polymer is sufficiently low.

For other polyaryletherketbnes, similar calculations can be made. These calculations are only intended as guidelines; actual conditions must be established experimentally.

Quench roll temperature does not play a significant role in this process since the temperature must be chosen so that a flat sheet is obtained, and this does not permit much variation. If the temperature is too high, the sheet will stick to the roll, and if it is too low, a flat uniform sheet will not be obtained. For most practical purposes, the quench temperature range will be from about 110° C. to just above the glass transition temperature of the polymer.

The choice of the quench rate also will depend upon the melt viscosity of the polymer (related to its molecular weight) and to the thickness of the sheet. To achieve the proper rate of cooling, the chill rolls must be capable of being heated, either electrically or by a heat transfer fluid, up to a temperature of about 160° C. One skilled in the art would be able to experimentally determine the optimum quench rate by running two or at most three simple experiments, especially in the light of the examples given herein, which illustrate the effect of the quench rate on the physical properties of the sheet and its thermoformability.

The amorphous polyaryletherketone sheet of this invention can be readily thermoformed by standard methods, using standard equipment, that is, by vacuum, pressure, mechanical, or twin sheet forming. Optimum conditions will vary depending upon specific design of machine and mold. These conditions can be readily established by techniques normally used by plastics engineers. The thermoforming temperature range of the PEKK sheet is from 160° C. to 300° C., but for the preferred compositions and smaller sheet thicknesses, it will be about 170° C. to 235° C., especially 175° C. to 200° C.

The time required to heat the sheet to the thermoforming temperature range prior to the forming event is an important variable in the process of thermoforming the sheet of this invention. In general, the preheat time should be minimized while still maintaining a uniform heat distribution in the sheet, in order to achieve uniform draw in the forming step. Since residence time will depend on process variables, such as sheet dimensions, particularly thickness, thermal characteristics of the particular oven and the forming temperature range desired, the exact forming conditions must be determined by experimentation and can be readily established by a plastics engineer. For PEKK sheets, it will be short, for example, 1 to 5 minutes. The following table provides a general guideline as to the recommended maximum temperatures for those two preheat times.

TABLE 2

| T/I isomer ratio | Maximum Recommended Sheet Temperature, °C. Preheat time | |
|---|---|---|
| | 1 minute | 5 minutes |
| 50/50 | 210 | 200 |
| 60/40 | 220 | 205 |
| 70/30 | 195 | 185 |

Although either radiant or convection ovens are suitable for preheating, radiant heaters are preferred because of their efficiency. Radiant heater surface temperatures normally are maintained between 500° C. and 1100° C., preferably between 600° C. and 900° C. Excessively high sheet temperatures or oven residence time can result in poor forming characteristics of the amorphous polyaryletherketone sheet, such as inadequate draw or lack of mold definition and brittleness in the formed articles. The cause of this behavior is believed to be the development of crystallinity in the polyaryletherketone polymer.

Thermoforming of polyaryletherketone sheet can be achieved by vacuum forming, with or without pressure or plug assist. Vacuum levels should be at least 68 kPa. Forming pressures will range from atmospheric to 690 kPa. Mold temperatures will range from ambient to 150° C. Elevated mold temperatures and/or additional pressure generally minimize internal stresses and provide better detail ad material distribution resulting in a more uniform part.

Thermoformed articles from the amorphous polyaryletherketone sheets demonstrate excellent mold shape and surface replication and retention of the original surface texture of the sheets. The formed articles substantially retain the physical properties of the sheet from which they were produced. Such thermoformed articles are useful in a variety of applications, including three-dimensional panels, ducts, and other components for aircraft interiors.

This invention is now illustrated by certain representative embodiments thereof, where all parts, proportions, and percentages are by weight, unless otherwise indicated.

EXAMPLE 1

Polyetherketoneketone made from diphenyl ether (DPE), terephthalyl chloride, and isophthalyl chloride with a T:I isomer ratio of 70:30, having a melt viscosity of 390 Pa-s at a shear rate of $180s^{-1}$ at 360° C. was extruded into 15.4 cm-wide, 0.15 cm-thick sheeting. Extrusion equipment consisted of a vented 30 mm twin screw extruder fitted with a 20.5 cm horizontal fixed slot die and a 3-roll chill roll stack of polished chrome. The extruder and the roll stack are schematically represented in FIG. 3, where E1, E2, and E3 are different extrude barrel zones; D is the die. Temperature profiles were as follows: E1=245° C., E2=360° C., and E3=358° C. The die temperature was 375° C., and the chill roll temperature was 106° C. The resulting amorphous sheeting, 15.4 cm×23.0 cm, was thermoformed using a Brown Machine Company vacuum thermoformer equipped with a "calrod" heater oven and a 9.63 cm diameter, 3.84 cm deep cylindrical "top hat" mold at room temperature. Using a vacuum of 94.5 kPa and forming temperatures of 185° C. to 193° C., the resulting articles were well formed, as shown by a thermoforming diameter ratio of 0.95, and had good mold replication.

Thermoforming diameter ratio, for articles made with a mold of this shape, is defined as the ratio of the diameter of the thermoformed article at a point equal to ⅞ the depth of the mold divided by the diameter of the mold. This ratio reflects the extent to which the molded sheet matches the shape of the mold, and, hence, how well a part is formed. A value of 1 indicates perfect formability, whereas for the purposes of this invention a thermoforming diameter ratio approximately equal to or greater than 0.85 indicates acceptable formability. For the purpose of the present disclosure, formability is defined as the ability to fill the mold completely, while mold replication refers to the ability to reproduce the surface details of the mold.

EXAMPLE 2

Polyetherketoneketone made from DPE and terephthalyl chloride and isophthalyl chloride, with a T:I isomer ratio of 70:30, containing 7% of Du Pont titanium dioxide R101® $TiO_2$, 0.003% Pfizer red pigment RO-3097 Kroma Red®, and 0.05% blue pigment Ferro V-3285 dark blue, having a melt viscosity of 532 Pa-s at a shear rate of 180 $s^{-1}$ at 360° C., was extruded into 74 cm-wide, 0.10 cm-thick amorphous sheeting. The equipment consisted of a 11.5 cm single screw, unvented extruder with a L/D ratio of 30:1 and a compression ratio of 3.5:1, equipped with a 340/250/177 micrometer screen pack and a 138 cm die reduced in width by means of a metal insert to 74 cm, set to a 0.25 cm wide gap; and a vertical, three roll, 20.5 cm diameter, polished chrome chill roll stack. The temperature profiles used are shown in FIG. 4, which is a schematic drawing showing the temperature profiles of the extruder and of the die. The vertical roll stack is schematically shown as FIG. 4a. E1, E2, E3, E4, and E5, are extruder barrel temperature zones; A is the adapter; and D1, D2, D3, D4, and D5 are die temperature zones. The temperatures were as follows: E1=383° C., E2=377° C., E3=371° C., E4=363° C., E5=349° C., for the barrel; A=371° C. for the adapter; and D1=364° C., D2=352° C., D3=354° C., D4=352° C., D5=364° C. for the die. The roll temperatures, from the top roll down, were, respectively, 146° C., 140° C., and 160° C. Tensile properties (ASTM D-1708) and Gardner impact strength (ASTM D-3029) were measured on the extruded sheet. The results are reported in Table 3. Sheeting samples, 15.4 cm×23.0 cm, were vacuum thermoformed using the same equipment as in Example 1. A forming temperature range of 182°–188° C. was used, and the resulting articles were well formed and demonstrated good mold replication and adequate retention of physical properties.

TABLE 3

| Sample | Tensile Strength at Max (MPa) | | Tensile Elongation at Break (%) | | Gardner Impact Str. (J) |
|---|---|---|---|---|---|
| | MD | TD | MD | TD | |
| Sheet | 84.6 | 81.5 | 111 | 86.6 | 7.7 |
| Article | 68.1 | 69.2 | 68.8 | 55.1 | — |

EXAMPLE 3

Polyetherketoneketone made from DPE and terephthalyl chloride and isophthalyl chloride with a T:I isomer ratio of 70:30, containing 7% by weight $TiO_2$, 0.003% Red, and 0.05% Blue, having a melt viscosity of 532 Pa-s at a shear rate of 180 $s^{-1}$ at 360° .C, was extruded into 74 cm-wide, 0.20 cm-thick sheeting using the equipment described in Example 2. Temperature profiles were the same as in Example 2, except that the chill roll stack was set at 146° C. to 140° C. for the top and center rolls and 160° C. on the bottom roll. The extruded sheet tensile and Gardner impact properties are listed in Table 4. Sheeting samples, 15.4 cm×23.0 cm, were vacuum thermoformed using the same equipment as in Example 1, except that the "top hat" mold was 2.6 cm deep. Forming temperature ranges of 193° C. to 199° C. resulted in articles that were marginal to unformed as shown by the thermoforming diameter ratio which was either unmeasurable or less than 0.85.

It can be seen from this Example that a 0.20 cm thick PEKK sheet with a T/I isomer ratio of 70:30 could not be quenched rapidly enough to avoid crystallinity under the experimental conditions.

TABLE 4

| Tensile Strength at Max (MPa) | | Tensile Elongation at Break % | | Tensile Modulus (MPa) | Gardner Impact | Thermoforming |
|---|---|---|---|---|---|---|
| MD | TD | MD | TD | MD | (J) | Diameter Ratio |
| 90.0 | 90.6 | 85.6 | 58.6 | 3816 | 0.9–1.4 | 0.77* |

*Most samples were not fully drawn to mold depth and therefore could not be measured.

EXAMPLE 4

Polyetherketoneketone made from DPE and phthalyl chloride with a T:I isomer ratio of 60:40, containing 12.3% by weight $TiO_2$, 0.07% Red, and 0.13% Blue, having a melt viscosity of 912 Pa-s at a shear rate of 156 $s^{-1}$ at 340° C., was extruded into 74-cm wide, 0.20 cm-thick amorphous sheeting using the equipment described in Example 2 but a different chill roll stack. The upper chill roll was a textured, 20.5 cm-diameter, cast silicone roll, and the bottom polished chrome chill roll was removed and placed behind the upper two rolls at an approximately 60° angle to the middle chill roll. The chill roll arrangement is shown in FIG. 4b. Extrusion temperature profiles were E1=338° C., E2=377° C., E3=377° C., E4=377° C., E5=349° C. and 332° C. for the barrel; A=338° C.; D1=340° C, D2=332° C., D3=332° C., D4=332° C. and D5=340° C. for the die. The upper chill roll temperature was 140° C.; the middle chill roll temperature was 130° C.; and the third chill roll was unheated. Tensile properties and Gardner impact strength are reported in Table 5. Gardner impact strength was 9.9 J on the smooth side and 36.2 J on the textured side. Sheeting samples, 15.4 cm×23.0 cm, were vacuum thermoformed using the same equipment as in Example 1. Forming temperature range was 190°–220° C., and the resulting parts were well formed, showed good mold replication, and had a good retention of physical properties.

TABLE 5

| Sample | Tensile Strength (MPa) | | Tensile Elongation % | | Tensile Modulus (MPa) | | Gardner Impact (J) | Thermoforming Diameter Ratio |
|---|---|---|---|---|---|---|---|---|
| | MD | TD | MD | TD | MD | TD | | |
| Sheet | 87.6 | 86.4 | 89.1 | 91.9 | 4027 | 3956 | 9.9–36.2 | — |
| Article | 77.0 | 73.0 | 86.1 | 82.1 | 3813 | not avail. | not avail. | 0.99 |

EXAMPLE 5

Polyetherketoneketone made from DPE and terephthalyl chloride and isophthalyl chloride with a T:I isomer ratio of 60:40, containing 12.3% TiO$_2$, 0.017% Red, and 0.13% Blue, having a melt viscosity of 912 Pa-s at a shear rate of 156 s$^{-1}$ at 340° C., was extruded into 74 cm-wide, 0.10 cm-thick sheeting using the equipment and conditions described in Example 4. Tensile properties and Gardner impact strength are reported in Table 6. Sheeting samples, 15.4 cm×23.0 cm, were vacuum thermoformed using the same equipment as in Example 1, with a 12.8 cm-diameter, 5.1 cm-deep "top hat" mold at room temperature. The resulting formed articles generally were well formed and had good mold definition.

Thermoforming diameter ratios were determined for various forming temperatures and residence times. Also determined in some runs was the percent crystallinity in the formed article; in each case, it was found to be less than 3% (the detection limit), so that the articles were completely amorphous. The data are given in Table 7. Crystallinity was determined using X-ray diffractometry. Scans were collected in the symmetrical transmission using an automated Phillips diffractometer and CuKa radiation. Data was collected in a fixed time mode with a step size of 0.02° 2θ and run from 4° to 60° 2θ. The background scattering in each diffraction pattern was fit with a cubic spline and removed. The portion of the data from 6° to 37° 2θ was used for the crystallinity measurement. The crystalline component in a semicrystalline sample was identified by subtracting the noncrystalline component from the diffraction pattern. The portion of the pattern remaining after the noncrystalline contribution was removed was considered the crystalline component. Crystallinite measurement is based on the technique published in *X-Ray Diffraction Methods in Polymer Science*, p. 171, Leroy E. Alexander, 2d Edition, 1979, Robert E. Krieger, Publisher, Huntington, NY.

EXAMPLE 6

Polyetherketoneketone made from DPE and terephthalyl chloride and isopohthalyl chloride with a T:I isomer ratio of 70:30, containing 5% TiO$_2$, having a melt viscosity of 403 Pa-s at a shear rate of 180 s$^{-1}$ at 360° C., was extruded using a 6.4 cm single-screw, vented extruder fitted with an 87 cm-wide horizontal die, set to 0.13 cm, and two polished chrome chill rolls. FIG. 5 is a schematic drawing representing the extruder and the vertical chill roll stack. Temperature profiles were E1=310° C. E2=336° C., E4=344° C. and E4=348° C. for the extruder barrel; A=348° C. for the adapter. The die temperature was 357° C., and the temperature of the chill rolls was 135° C. The resulting extruded sheet was 72 cm wide and 0.10 cm thick. Tensile properties and Gardner impact strength are given in Table 8. The sheeting was vacuum thermoformed using the same equipment as in Example 5. The resulting formed articles generally were well formed and had good mold definition. Thermoforming diameter ratios at various forming temperatures and residence times as well as the corresponding crystallinities, were determined. The results are reported in Table 9. It can be seen that satisfactory results are obtained in the range of 180° C. to 200° C.

TABLE 8

| Sample | Tensile Strength at Max (MPa) MD | TD | Tensile Elongation at Break (%) MD | TD | Tensile Modulus (MPa) MD | TD | Gardner Impact (J) |
| --- | --- | --- | --- | --- | --- | --- | --- |
| Sheet | 80.7 | 78.6 | 105 | 90.7 | 3972 | 3792 | 36.2 |
| Article | 75.3 | 74.8 | 92.8 | 95.5 | not avail. | not avail. | not avail. |

TABLE 9

| Forming Temperature (°C.) | Residence Time (Min) | Thermoforming Diameter Ratio | % Crystallinity |
| --- | --- | --- | --- |
| 170 | 0.90 | 0.87 | 0 |
| 190 | 1.38 | 0.94 | 0 |
| 195 | 1.57 | 0.97 | 0 |
| 195 | 2.17 | 0.95 | not measured |
| 195 | 3.22 | 0.90 | 2-3 |
| 200 | 1.45 | 0.99 | not measured |

I claim:

1. A polyaryletherketone sheet having a thickness of about 625 to 5000 micrometers, wherein the polyaryle-

TABLE 6

| Sample | Tensile Strength at Max (MPa) MD | TD | Tensile Elongation at Break (%) MD | TD | Gardner Impact (J) |
| --- | --- | --- | --- | --- | --- |
| Sheet | 83.1 | 79.1 | 113 | 109 | 36.2 |
| Part | 77.4 | 79.3 | 86.1 | 88.5 | not avail. |

TABLE 7

| Forming Temperature (°C.) | Residence Time (Min) | Thermoforming Diameter Ratio | % Crystallinity |
| --- | --- | --- | --- |
| 180 | 0.97 | 0.94 | 0 |
| 190 | 1.27 | 0.97 | 0 |
| 200 | 0.80 | 0.99 | not measured |
| 200 | 1.12 | 0.98 | not measured |
| 200 | 1.97 | 0.99 | not measured |
| 220 | 1.67 | 0.99 | 0 | therketone has a crystallinity of less than about 5% and consists essentially of repeating units selected from the group represented by the following formulas I, II, or III:

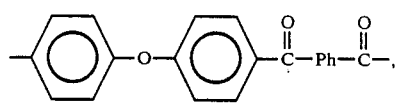

-continued

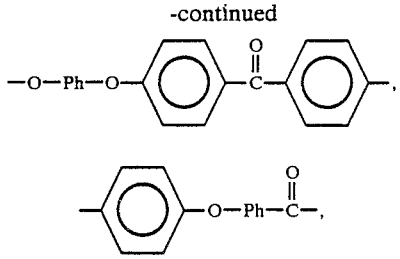

wherein Ph is either the 1,4-phenylene or the 1,3-phenylene group provided that the 1,4-phenylene to 1,3 phenylene isomer ratio is 70:30 to 0:100.

2. A sheet of claim 1 wherein the polyaryletherketone is a polyetherketoneketone having a repeating unit represented by formula I.

3. A sheet of claim 2, wherein the 1,4-phenylene to 1,3-phenylene isomer ratio is about 70:30 to 0:100, and the sheet thickness is about 625–1250 micrometers.

4. A sheet of claim 2, wherein the 1,4-phenylene to 1,3-phenylene isomer ratio is at most 60:40.

5. A sheet of claim 4, wherein the 1,4-phenylene to 1,3-phenylene isomer ratio is about 60:40 to 50:50, and the sheet thickness is about 625–2000 micrometers.

6. A sheet of claim 1, which contains non-nucleating fillers in an amount of up to 50 weight percent of the sheet composition.

7. A sheet of claim 4, which contains non-nucleating fillers in an amount of up to 50 weight percent of the sheet composition.

8. A sheet of claim 7, wherein up to 5% of the sheet composition is an inorganic fibrous filler.

9. A process for fabricating a polyaryletherketone sheet having a thickness of about 625 to 5000 micrometers, wherein the polyaryletherketone has a crystallinity of less than about 5% and consists essentially of repeating units selected from the group represented by the following formulas I, II, or III:

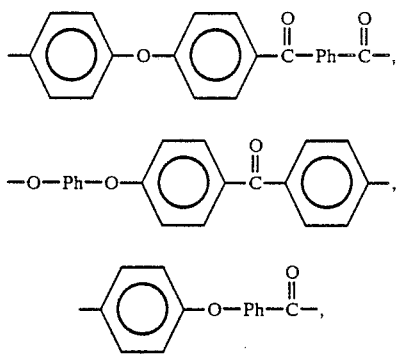

wherein Ph is either the 1,4-phenylene or the 1,3-phenylene group provided that the 1,4-phenylene to 1,3 phenylene isomer ratio is 70:30 to 0:100, said process comprising the steps of (a) heating the polyaryletherketone to a suitable processing temperature above its melting point, (b) forming the molten polymer into a sheet, and (c) quenching the sheet at a rate such that the quench time between the melt processing temperature and the lowest temperature at which significant crystallization occurs is at most equal to the shortest crystallization half-time multiplied by 10/maximum crystallinity, wherein the shortest crystallization half-time is defined as the shortest amount of time it takes a copolyetheketone sample to reach the crystallization exotherm maximum, as determined by differential scanning calorimetry, and maximum crystallinity is determined for a given polyaryletherketone by X-ray crystallography.

10. The process of claim 9, wherein the polyaryletherketone is a polyetherketoneketone having repeating units of formula I.

11. A process of claim 10, wherein the 1,4-phenylene to 1,3-phenylene isomer ratio is about 70:30 to 0:100, and the sheet thickness is about 625–1250 micrometers.

12. A process of claim 10 wherein the 1,4-phenylene to 1,3-phenylene isomer ratio is at most 60:40.

13. A process of claim 12 wherein the 1,4-phenylene to 1,3-phenylene isomer ratio is about 60:40 to 50:50, and the sheet thickness is about 625–2000 micrometers.

14. A process of claim 9 wherein the sheet fabrication temperature is about 10° C.–50° C. above the polyaryletherketone melting point.

15. A process of claim 14, wherein the fabricated sheet is quenched on one or more rolls maintained in the temperature range of about 110° C. to just above the glass transition temperature of the polyaryletherketone.

16. A process of claim 15, wherein the polyaryletherketone is a polyetherketoneketone having a repeating unit of formula I.

17. An amorphous three-dimensional panel or duct made of a polyaryletherketone by the process of claim 9.

18. An amorphous three-dimensional panel or duct made of polyaryletherketone by the process of claim 13.

19. An amorphous three-dimensional panel or duct thermoformed of a polyaryletherketone sheet having a wall thickness of about 625 to 5000 micrometers, wherein the polyaryletherketone has a crystallinity of less than about 5% and consists essentially of repeating units selected from the group represented by the following formulas I, II, or III:

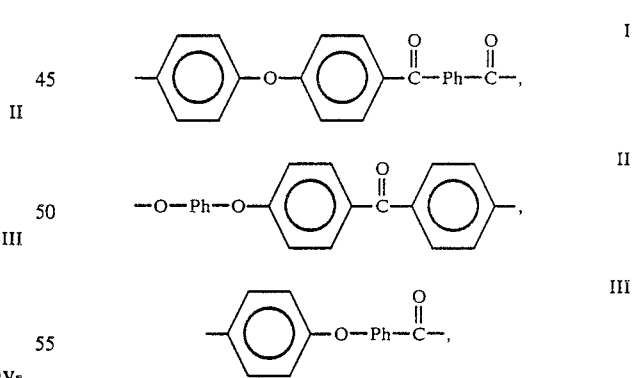

wherein Ph is either the 1,4-phenylene or the 1,3-phenylene group provided that the 1,4-phenylene to 1,3 phenylene isomer ratio is 70:30 to 0:100.

20. An amorphous three-dimensional panel or duct of claim 19 made of a polyaryletherketone consisting essentially of repeating units represented by formula I, wherein the 1,4-phenylene to 1,3-phenylene isomer ratio is about 60:40/50:50, and the wall thickness of the panel or duct is about 625–2000 micrometers.

* * * * *